United States Patent
Liu et al.

(10) Patent No.: US 10,251,209 B2
(45) Date of Patent: Apr. 2, 2019

(54) SMART 3GDT

(75) Inventors: Di Liu, Shanghai (CN); Qi Xia, Shanghai (CN); Huiping Ding, Shanghai (CN); Ping Sha, Shanghai (CN); Zhiwei Qu, Shanghai (CN); Zhao Yu, Shanghai (CN); Lei Guo, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1125 days.

(21) Appl. No.: 13/816,109

(22) PCT Filed: Feb. 14, 2012

(86) PCT No.: PCT/CN2012/000175
§ 371 (c)(1),
(2), (4) Date: Feb. 8, 2013

(87) PCT Pub. No.: WO2013/120223
PCT Pub. Date: Aug. 22, 2013

(65) Prior Publication Data
US 2014/0056235 A1 Feb. 27, 2014

(51) Int. Cl.
*H04W 76/04* (2009.01)
*H04W 76/23* (2018.01)
(Continued)

(52) U.S. Cl.
CPC ......... *H04W 76/23* (2018.02); *H04L 43/0894* (2013.01); *H04W 76/22* (2018.02); *H04W 24/04* (2013.01); *H04W 24/08* (2013.01)

(58) Field of Classification Search
CPC ..... H04W 24/04; H04W 24/08; H04W 24/02; H04W 76/041; H04W 76/043;
(Continued)

(56) References Cited

U.S. PATENT DOCUMENTS 8,218,535 B1 7/2012 Hurtta et al.
8,400,950 B2 3/2013 Ko et al.
(Continued)

FOREIGN PATENT DOCUMENTS

| EP | 2299754 A1 | 3/2011 |
|---|---|---|
| WO | 2010039085 A1 | 4/2010 |
| WO | 2010057529 A1 | 5/2010 |

OTHER PUBLICATIONS

TS 23.060 V11.0.0, "General Packet Radio Service (GPRS); Service description; Stage 2", Dec. 2011.*
Non-Final Office Action dated May 22, 2015, issued in U.S. Appl. No. 14/126,471, 24 pages.
3GPP TR 23.809 V1.0.0, "3rd Generation Partnership Project: Technical Specification Group Services and System Aspects; One Tunnel Functional description; (Release 7)," XP-002449389, Sep. 2006, 50 pages
(Continued)

*Primary Examiner* — Oussama Roudani
(74) *Attorney, Agent, or Firm* — Rothwell, Figg, Ernst & Manbeck, p.c.

(57) ABSTRACT

A smart 3GDT schema has been disclosed, in detail, a method for controlling the communication of a network system has been disclosed. The network system comprises a UE, a NodeB, a RNC, a SGSN, and a GW. The UE is arranged to be in communication with the RNC via the NodeB, and the RNC is arranged to be in communication with the SGSN which in turn being arranged to be in communication with the GW for non-3GDT communication of the network system, or the RNC is arranged to be in communication with the GW for 3GDT communication of the network system. In this method, statistics of payload transferred between the UE and the GW has been monitored, and if the statistics of payload within a predetermined time period exceeds a first threshold, and the UE is in the non-3GDT communication, then switching the non-3GDT communication to the 3GDT communication. The present application has also disclosed the SGSN, GW, and the network system adaptive to perform the method.

18 Claims, 2 Drawing Sheets

(51) Int. Cl.
*H04L 12/26* (2006.01)
*H04W 76/22* (2018.01)
*H04W 24/08* (2009.01)
*H04W 24/04* (2009.01)

(58) Field of Classification Search
CPC . H04L 43/0817; H04L 43/10; H04L 41/5025; H04L 45/22; H04L 43/0894
See application file for complete search history.

(56) References Cited

U.S. PATENT DOCUMENTS

| | | | |
|---|---|---|---|
| 8,432,871 | B1 | 4/2013 | Samaik et al. |
| 9,203,629 | B2 | 12/2015 | Momtahan et al. |
| 2005/0243762 | A1* | 11/2005 | Terry et al. .................. 370/328 |
| 2008/0020775 | A1 | 1/2008 | Willars |
| 2008/0049777 | A1 | 2/2008 | Morrill et al. |
| 2008/0119160 | A1 | 5/2008 | Andriantsiferana et al. |
| 2009/0197597 | A1 | 8/2009 | Kotecha |
| 2010/0085978 | A1 | 4/2010 | Ramankutty et al. |
| 2010/0157887 | A1 | 6/2010 | Kopplin |
| 2010/0281157 | A1 | 11/2010 | Ramankutty et al. |
| 2010/0322068 | A1 | 12/2010 | Grahn et al. |
| 2011/0002240 | A1 | 1/2011 | Harel et al. |
| 2011/0070906 | A1 | 3/2011 | Chami et al. |
| 2011/0075557 | A1 | 3/2011 | Chowdhury et al. |
| 2011/0158090 | A1 | 6/2011 | Riley et al. |
| 2011/0222430 | A1* | 9/2011 | Angervuori et al. ......... 370/252 |
| 2011/0267980 | A1 | 11/2011 | Calippe et al. |
| 2012/0005332 | A1* | 1/2012 | Beattie et al. ................ 709/224 |
| 2012/0020218 | A1 | 1/2012 | Li et al. |
| 2012/0052866 | A1 | 3/2012 | Froehlich et al. |
| 2012/0057463 | A1 | 3/2012 | Hurtta et al. |
| 2012/0106349 | A1 | 5/2012 | Adjakple et al. |
| 2012/0188895 | A1 | 7/2012 | Punz et al. |
| 2012/0201137 | A1* | 8/2012 | Le Faucheur ..... H04W 28/0226 370/235 |
| 2012/0208562 | A1 | 8/2012 | Wilkin et al. |
| 2012/0226733 | A1 | 9/2012 | Kim et al. |
| 2012/0317269 | A1 | 12/2012 | Weppler et al. |
| 2013/0208661 | A1 | 8/2013 | Nylander et al. |
| 2014/0056235 | A1 | 2/2014 | Liu et al. |

OTHER PUBLICATIONS

ETSI TR 123 919 V7.0.0, "Digital Cellular Telecommunications System (Phase 2+); Universal Mobile Telecommunications System (UMTS); Direct Tunnel Deployment Guideline (3GPP TR 23.919 version 7.0.0 Release 7)," Jun. 2007, 13 pages.
Extended European Search Report in European Apln. No. 128687852 dated Nov. 25, 2015, 9 pages.
Office Action in related Japanese patent application 2014-555909 dated Sep. 29, 2015, with English translation, 5 pages.
"3rd Generation Partnership Project; Technical Specification Group Core Network and Terminals;3GPP Evolved Packet System (EPS); Evolved General Packet Radio Service (GPRS) Tunnelling Protocol for Control plane (GTPv2-C); Stage 3 (Release 10)", 3GPP TS 29.274 V10.0.0 (Sep. 2010), 172 pages.
"3rd Generation Partnership Project; Technical Specification Group Core Network and Terminals; Policy and Charging control over Gx reference point (Release 10)",3GPP TS 29.212 V10.0.0 (Sep. 2010), 121 pages.
"3rd Generation Partnership Project; Technical Specification Group Core Network and Terminals; General Packet Radio Service (GPRS); GPRS Tunnelling Protocol (GTP) across the Gn and Gp interface (Release 10)", 3GPP TS 29.060 V10.0.0 (Dec. 2010), 162 pages.
"Generic Policy Control for Local Breakout", ip.com Journal, ip.com Inc., West Henrietta, NY, US, Nov. 17, 2009, 12 pages, XP013135390.
"3rd Generation Partnership Project; Technical Specification Group Services and System Aspects; Local IP Access and Selected IP Traffic Offload (LIPA-SIPTO) (Release 10)", 3GPP Standard; 3GPP TR 23.829, 3rd Generation Partnership Project (3GPP), Mobile Competence Centre; 650, Route Des Lucioles; F-06921 Sophia-Antipolis Cedex; France No. V10.0.0, Mar. 29, 2011, pp. 1-43, XP050476492.
Bari, F., "IEEE SAE and Evolved Packet Core", Seattle Communications (COM-19) Society Chapter, Nov. 13, 2008, 43 pages.
Notice of Allowance issued in U.S Appl. No. 14/126,471, dated Feb. 5, 2018, 18 pages.

* cited by examiner

SMART 3GDT

CROSS-REFERENCE TO RELATED APPLICATION

This application is a 35 U.S.C. § 371 National Phase Entry Application from PCT/CN2012/000175, filed Feb. 14, 2012, and designating the United States. Said application is incorporated by reference herein in its entirety.

TECHNICAL FIELD

The invention relates to the field of 3GPP telecommunication system, especially the WCDMA/TD-SCDMA system. In particularly, the invention relates to 3GDT communication used in the 3GPP telecommunication system. The invention further relates to a computer program and a computer program product for implementing the system, method and the components thereof as mentioned above.

BACKGROUND

Abbreviations:
3GDT 3G Direct Tunnel
3GPP 3rd Generation Partnership Project
APN Access Point Name
BSC Base Station Controller
CN Core Network
DNS Domain Name System
ECM EPS Connection Management
EMM EPS Mobility Management
EPC Evolved Packet Core
EPS Evolved Packet System
E-RAB E-UTRAN Radio Access Bearer
E-UTRAN Evolved Universal Terrestrial Radio Access Network
GGSN Gateway GPRS Support Node
GTP GPRS Tunneling Protocol
GTP-U GTP user data tunneling
GUMMEI Globally Unique MME Identifier
GUTI Globally Unique Temporary Identity
GW Gateway
HLR Home location register
IE Information Element
IM Instant Message
IMSI International Mobile Subscriber Identity
IP Internet Protocol
ISD Insert Subscriber Data
ISRAU Inter SGSN Routing Area Update
MM Mobility Management
MME Serving GPRS Support Node
MME Mobility Management Entity
MS Mobile Station
MT Mobile Terminating
NRI Network Resource Identifier
P GW PDN Gateway
PDP Packet Data Protocol
PDU Packet Data Unit
PLMN Public Land Mobile Network
PS Packet Switched
P-TMSI Packet Temporary Mobile Subscriber Identity
RAB Radio Access Bearer
RAI Routing Area Identity
RAN Radio Access Network
RAT Radio Access Technology
RAU Routing Area Update
RNC Radio Network Controller
SGW Serving Gateway
SRNS Serving Radio Network Subsystem, the change of Iu instance and transfer of the SRNS role to another RNS.
TAI Tracking Area Identity
TAU Tracking Area Update
TEID Tunnel Endpoint Identifier
UE User Equipment
UMTS Universal Mobile Telecommunications System
UP User Plane
References:
3GPP TS 24.008
3GPP TS 25.413
3GPP TS 29.060
3GPP TS 29.274

In the 3GPP WCDMA/TD-SCDMA system, 3GDT enables setup of a GPRS Tunneling Protocol (GTP) tunnel for transporting payload traffic between a GGSN/GW or a SGW and an RNC directly, thus bypassing the SGSN. GPRS Tunneling Protocol (GTP) is a group of IP-based communications protocols used to carry General Packet Radio Service (GPRS) within GSM, or UMTS and EPS within LTE networks. The tunnel separates the user traffic from the control traffic and reduces the payload traffic through the SGSN. However, even though the GTP tunnel has many advantages, GTP tunnel may has some disadvantages that the 3GDT will consume a lot of signaling load of the SGSN, GGSN/GW or the SGW, especially in cases that the PDU has very short length or UE uses a low bit rate application and connection requires to be released and reconnected frequently, such as some IM (Instant Message) applications.

SGSN may decide to use 3GDT for some UEs based on some condition, for example, subscription data, non-roaming, RAC of IMEISV, capability of RNC and GW, and user QoS information etc. However, due to various applications running on UEs, the statistics of the connection between UE and GGSN/PGW or a SGW may also be variable from time to time. For example, when a IM application is running on a UE, the data payload may employ PDUs of short length, and the connection may be released and reconnected frequently, and it is desired that a traditional communication (non-3GDT communication) to be established. However, when a video streaming client is running on the UE, the data payload may employ PDUs of long length, and the connection may be kept as long as possible, and it is desired that a 3GDT communication to be established.

Thus, one problem associated with 3GPP WCDMA/TD-SCDMA system according to prior art lies in that, the SGSN can not dynamically switch the traditional communication and 3GDT communication smoothly based on the property of the connection between UE and GGSN/PGW or a SGW.

There is a need for a smart 3GDT schema in the 3GPP WCDMA/TD-SCDMA system, which can switch the traditional communication and 3GDT communication dynamically so that both the load of SGSN payload plane and the load of SGSN/GW control plane can be decreased.

SUMMARY

The object of the present invention is to provide a method for controlling the communication of a 3GPP WCDMA/TD-SCDMA system where at least the previously mentioned problems are avoided.

According to the present invention, a non-3GDT communication will be switched to a 3GDT communication when statistic of payload transferring between the UE and the GW has exceeded a threshold, and a 3GDT communication will be switched to a non-3GDT communication when statistic of payload transferring between the UE and the GW is below a further threshold.

The present invention relates to a method for controlling the communication of a network system, the network system comprising a UE, a NodeB, a RNC, a SGSN, and a GW, the UE is arranged to be in communication with the RNC via the NodeB, the RNC is arranged to be in communication with the SGSN which in turn being arranged to be in communication with the GW for non-3GDT communication of the network system, or the RNC is arranged to be in communication with the GW for 3GDT communication of the network system, the method comprises monitoring statistical of payload transferring between the UE and the GW; and if the statistic of payload within a predetermined time period exceeds a first threshold, and the UE is in the non-3GDT communication, then switching the non-3GDT communication to the 3GDT communication.

The method may also allow switching the 3GDT communication to the non-3GDT communication if the statistic of payload within a predetermined time period below a second threshold lower than the first threshold, and the UE is in the 3GDT communication.

In this method, the statistic of payload to be monitored can be at least any one selected from a group comprising a real bit rate, a ratio of real bit rate over maximum bit rate (MBR), a traffic class, ratio of GBR, transfer delay, a preference level of server IP or whole server IP, a traffic handling priority, a Allocation/Retention priority, and a Evolved Allocation/Retention priority, and/or the combination thereof.

The present invention further relates to a network system, comprising a UE, a NodeB, a RNC, a SGSN, and a GW, the UE is arranged to be in communication with the RNC via the NodeB, the RNC is arranged to be in communication with the SGSN which in turn being arranged to be in communication with the GW for non-3GDT communication of the network system, or the RNC is arranged to be in communication with the GW for 3GDT communication of the network system. In this network system, the SGSN or the GW is configured to monitor statistics of payload transferring between the UE and the GW, and the communication between UE and the GW can be switched between the non-3GDT communication and the 3GDT communication based on the monitored statistics of the payload.

One advantage of the invention lies in that, the communication between the UE and the GW can be switched between the non-3GDT communication and the 3GDT communication smartly based on a monitored statistics of the payload, so that a communication of suitable type can be established for any UEs, and such type can be changed dynamically based on the network connections required by applications running on UEs. This will not introduce extra signaling or message to the existing network but effectively make full use of the advantage of 3GDT and will not introduce the disadvantage of 3GDT, thus improves the network quality.

More advantageous features of the method, the network system and the components thereof according to the invention will be described in the description hereinafter and in the appended claims.

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

Figure 1:
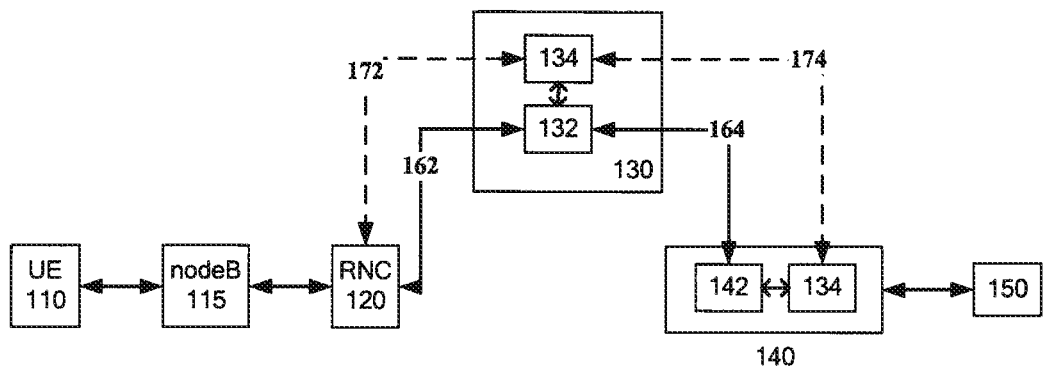
FIG. 1 schematically shows a network system with non-3GDT communication established according to the invention.

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Figure 2:
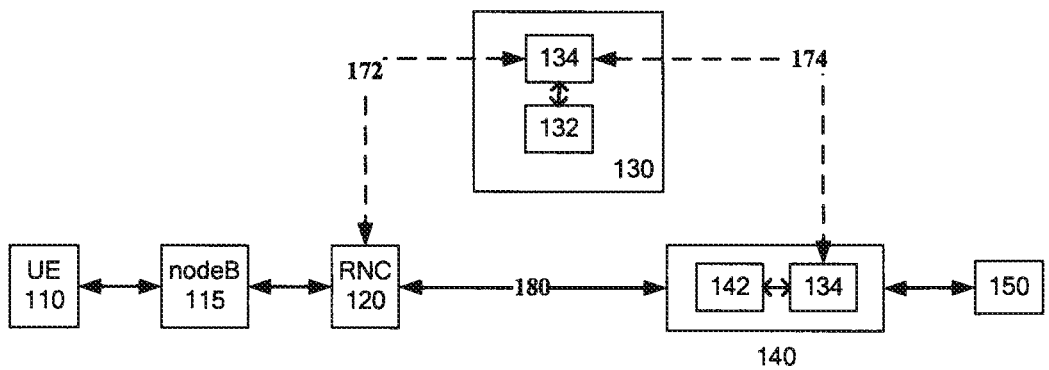
FIG. 2 schematically shows a network system with 3GDT communication established according to the invention.

FIG. 1 schematically shows a network system 100 with non-3GDT communication established. FIG. 2 schematically shows a network system 100 similar to that of FIG. 1 except that in FIG. 2, a 3GDT communication has been established. The system 100 comprises a UE 110, a NodeB 115, a RNC 120, a SGSN 130 and a GW 140. It should be noted that the system 100 may comprise other components, such as an IP network 150, however, for the purpose of clarity, only components involved in concept of the present application have been shown.

As shown in FIG. 1, in non-3GDT communication, the UE 110 is arranged to be connected to the RNC 120 via the NodeB 115, and the RNC 120 is arranged to be connected to the SGSN 130 for non-3GDT communication via a first non-3GDT connection 162, and the SGSN 130 is arranged to be connect to the GW 140 via a second non-3GDT connection 164. The first non-3GDT connection 162 and the second non-3GDT connection 164 constitute user plane connections for transporting the payload traffic. It can be seen that, in non-3GDT communication, the SGSN 130 can not be bypassed, so the non-3GDT connection can also be called as two-tunnel communication.

In addition, as shown in FIG. 1, the control traffic can be transported via a first control connection 172 between RNC 120 and SGSN 130 and a second control connection 174 between SGSN 130 and the GW 140 so that the SGSN 130 can take control over RNC 120 and the GW 140 regarding the communication between RNC 120 and GW 140.

In 3GDT communication shown in FIG. 2, as contrast to FIG. 1, the RNC 120 is arranged to be directly connected to the SGSN 130 for 3GDT communication via a 3GDT connection 180 and thus the SGSN 130 is bypassed when transporting payload traffic between RNC 120 and the GW 140. However, the control traffic may be transported similar to the configuration of FIG. 1, that is, the control traffic is still routed as those in the two-tunnel solution, and the SGSN 130 still can take control over the RNC 120 and the GW 140.

It should be noted that the system illustrated in FIGS. 1 and 2 is not limited to specific communication system, in fact, this system can be applicable to any communication system with 3GDT enabled. For example, this system can be applicable to systems setup for 3GDT using Gn/Gp architecture or using S3/S4 architecture, that is, the GW 140 can be GGSN/SGW in Gn/Gp architecture, or SGW in S3/S4 architecture.

As shown in FIG. 1, when the payload traffic is transported via two-tunnel communication, the SGSN 130 may monitor the statistics of the payload transported between the UE 120 and the GW 140 via the SGSN 130. If the statistics of the payload been monitored over a predetermined time period exceeds a first threshold, then the SGSN 130 may switch the two-tunnel communication to a 3GDT communication.

Optionally, the SGSN 130 may comprise a first monitor 132 and a first controller 134. The first monitor 132 may monitor the statistics of payload transferring between the UE 120 and the GW 140, and send the acquired statistics of payload to the first controller 134. The first controller 134 may determine whether the statistics of payload over the predetermined time period has exceeded the first threshold. If so, which means the payload transported belongs to a high traffic and a directly 3GDT communication is suitable for transporting such payload, then the first controller 134 may further switch from the two-tunnel communication to the 3GDT communication. If the statistics of payload over the predetermined time period has not exceeded the first threshold, then the two-tunnel communication is kept unchanged and the first monitor 132 may continue monitoring the statistics of payload.

It should be noted that, the statistics of payload to be monitored can be any attribute related to the payload. Optionally, the statistics of payload can be any one selected from a group comprising a real bit rate, a ratio of real bit rate over maximum bit rate (MBR), a traffic class, ratio of GBR, transfer delay, a preference level of server IP or whole server IP, a traffic handling priority, a Allocation/Retention priority, and a Evolved Allocation/Retention priority, and/or the combination thereof.

In the following description, the real bit rate (real BR) and a ratio of real bit rate (real BR) over maximum bit rate (MBR) will be taken as example to describe the statistics of payload.

In Table 1, an example that the real BR has been monitored to trigger the switch from two-tunnel communication to the 3GDT communication has been illustrated. As shown in Table 1, the first threshold is set to 4 Mbps, so when the real BR monitored within a predetermined time period has exceeded 4 Mbps, then switch is triggered and the SGSN 130 will switch two-tunnel communication to the 3GDT communication.

TABLE 1

| | MBR(Mbps) | Real BR(Mbps) | Real BR >= 4 Mbps? | Comments |
| --- | --- | --- | --- | --- |
| UE 1 | 21 | 20 | YES | Switch to 3GDT |
| UE 2 | 21 | 3 | NO | Keep two-tunnel |
| UE 3 | 16 | 5 | YES | Switch to 3GDT |
| ... | ... | ... | ... | ... |
| UE N | 3 | 3 | NO | Keep two-tunnel |

In Table 2, an example that the ratio of real BR over MBR (real BR/MBR) has been monitored to trigger the switch from two-tunnel communication to the 3GDT communication has been illustrated. As shown in Table 2, the first threshold is set to 0.75, so when the ratio monitored within a predetermined time period has exceeded 0.75, then switch is triggered and the SGSN 130 will switch two-tunnel communication to the 3GDT communication.

TABLE 2

| | MBR(Mbps) | Real BR(Mbps) | (RealBR)/ MBR >= 0.75? | Comments |
| --- | --- | --- | --- | --- |
| UE 1 | 21 | 20 | YES | Switch to 3GDT |
| UE 2 | 21 | 3 | NO | Keep two-tunnel |
| UE 3 | 16 | 5 | NO | Keep two-tunnel |
| ... | ... | ... | ... | ... |
| UE N | 3 | 3 | YES | Switch to 3GDT |

In Table 3, a further example that the combination of the real BR and the ratio of real BR over MBR (real BR/MBR) been monitored to trigger the switch from two-tunnel communication to the 3GDT communication has been illustrated. As shown in Table 3, if the first thresholds set for the real BR and the ratio of real BR over MBR have both been exceeded, then switch is triggered and the SGSN 130 will switch two-tunnel communication to the 3GDT communication.

TABLE 3

| | MBR(Mbps) | Real BR(Mbps) | Real BR >= 4 Mbps && (Real BR)/ MBR >= 0.75? | Comments |
| --- | --- | --- | --- | --- |
| UE 1 | 21 | 20 | YES | Switch to 3GDT |
| UE 2 | 21 | 3 | NO | Keep two-tunnel |
| UE 3 | 16 | 5 | NO | Keep two-tunnel |
| ... | ... | ... | ... | ... |
| UE N | 3 | 3 | NO | Keep two-tunnel |

Optionally, the predetermined time period for monitoring the statistics of pay load can be preset by the system operator based on the system configuration, the usage of the system and so on. In an embodiment, the predetermined time period can be set to 60 second.

Referring back to FIG. 2, when the payload traffic is transported via 3GDT communication, the GW 140 may monitor the statistics of the payload transported between the UE 120 and the GW 140. If the statistics of the payload been monitored over a predetermined time period below a second threshold, then the GW 140 may switch the 3GDT communication to the two-tunnel communication.

Optionally, the GW 140 may comprise a second monitor 142 and a second controller 144. The second monitor 142 may monitor the statistics of payload transferring between the UE 120 and the GW 140, and send the acquired statistics of payload to the second controller 144. The second controller 144 may determine whether the statistics of payload over the predetermined time period below the second threshold. If so, which means the payload transported belongs to a low traffic and a traditional non-3GDT communication is suitable for transporting such payload, then the second controller 144 may further cooperate with the SGSN 130 (particularly, the first controller 134) to switch from the 3GDT communication to the two-tunnel communication. If the statistics of payload over the predetermined time period do not below the second threshold, then the 3GDT communication is kept unchanged and the second monitor module 142 may continue to monitor the statistics of payload.

The statistics of payload and the predetermined time period described in FIG. 2 may be similar to those described in FIG. 1. For the purpose of concise, the description related to the statistics of payload and the predetermined time period is omitted here.

The second threshold should be set to be lower than the first threshold so that the switch between the 3GDT communication and two tunnel communication can be performed. It should further be noted that, if the second threshold is set to be close to the first threshold, due to the variable nature of the communication, the switch may be frequently trigged, and may render the transport between the UE 120 and the GW 140 unstable and result in more signaling load on the SGSN 130. In a embodiment, the second threshold is set to be much lower than the first threshold, so that the difference between the first threshold and the second threshold can accommodate the variation of statistics being monitored. Optionally, in the case that the real BR is selected as the statistics of payload and the first threshold is set to 4 Mbps, the second threshold can be set to 1 Mbps. In the case that the ratio of real BR over MBR is selected as the statistics of payload and the first threshold is set to 0.75, the second threshold can be set to 0.25.

In the following description, the details of switching between the 3GDT communication and two-tunnel communication will be described. It should be noted that the message described in the following is just for the purpose of illustration, and the present application is not limited to the specific message format and the specific GW types.

In the case that the GW 140 is GGSN, that is, in the Gn/Gp architecture, when switching from the non-3GDT communication to the 3GDT communication, the SGSN 130 (especially the first controller 134) sends "Update PDP Context Request" message to the GGSN 140, and the SGSN 130 also sends "RAB Assignment" message to the RNC 120, so that a directly 3GDT connection between RNC 120 and GGSN 140 is established. When switching 3GDT communication to non-3GDT communication, the GGSN 140 (especially the second controller 144) sends "Update PDP Context Request" message to SGSN 130; and the SGSN 130 (especially the first controller 134) sends "RAB assignment" message to the RNC 120, so that the directly 3GDT connection is broken, and the two-tunnel connection via the SGSN 130 is established.

In the case the GW 140 is SGW, that is, in the S3/S4 architecture, when switching from the non-3GDT communication to the 3GDT communication, the SGSN 130 (especially the first controller 134) sends "Modify Bearer request" message to the SGW 140, and the SGSN 130 also sends "RAB Assignment" message to the RNC 120, so that a directly 3GDT connection between RNC 120 and SGW 140 is established. When switching 3GDT communication to non-3GDT communication, the SGW 140 (especially the second controller 144) sends "Update Bearer Request" message to SGSN 130; and the SGSN 130 (especially the first controller 134) sends "RAB assignment" message to the RNC 120, so that the directly 3GDT connection is broken, and the two-tunnel connection via the SGSN 130 is established.

Figure 3:
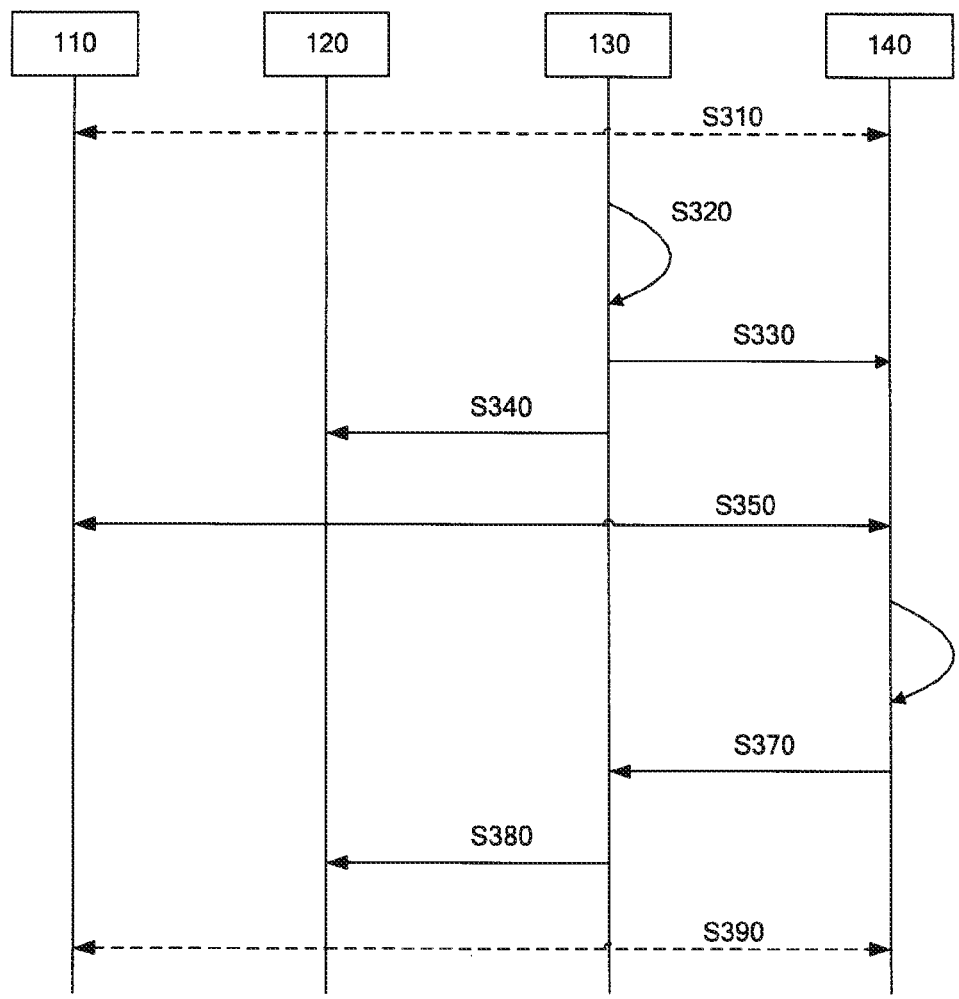
FIG. 3 schematically shows a block diagram of a method for controlling the communication of a network system according to the invention.

FIG. 3 schematically shows a block diagram of the method 300 for controlling the communication of a network system. The network system can be the system 100 described above in connection with FIGS. 1 and 2. Method 300 begins with S310, in which a traditional communication, that is, a non-3GDT communication has been established between the UE 120 and the GW 140 via the SGSN 130. It should be noted that, method 300 is focused on switching the communication between two-tunnel and 3GDT, so it does not matter that the method 300 begins with which communication type.

In step S320, the statistics of payload transferred between the UE 110 and the GW 140 is monitored, and whether the statistics of payload within a predetermined time period has exceeded a first threshold or not is determined. Since current communication is in non-3GDT communication, so if the statistic of payload within the predetermined time period has exceeded the first threshold, then a switch from the non-3GDT communication to the 3GDT communication is trigged. On the contrary, if the statistic of payload within the predetermined time period has not exceeded the first threshold, then the step S320 will continue to monitor the statistic of payload transferring between the UE 110 and the GW 140.

It should be noted that, since the two-tunnel communication must pass through the SGSN 130, the step S320 is suitable to be executed on the SGSN 130.

If it is determined to trigger switch in step S320, then in step S330 and S340, by transmitting messages between the RNC 120, SGSN 130 and the GW 140, the switch can be achieved. The detail messages transmitted can be varied depending on the type of the GW 140.

For example, if the GW 140 is GGSN (in the Gn/Gp architecture), then in Step S330, the SGSN 130 sends "Update PDP Context Request" message to the GGSN 140, and in Step S340, the SGSN 130 sends "RAB Assignment" message to the RNC 120, so that in Step S350 a directly 3GDT connection between RNC 120 and GGSN 140 is established.

If the GW 140 is SGW, (in the S3/S4 architecture), then in Step S330, the SGSN 130 sends "Modify Bearer request" message to the SGW 140, and in Step S340, the SGSN 130 sends "RAB Assignment" message to the RNC 120, so that in Step S350 a directly 3GDT connection between RNC 120 and SGW 140 is established.

It should be noted that the present application is not limited to the specific message described above, any other messages which can to used to switch the communication can also be applicable without departure the scope of the present application.

After in Step S350, a directly 3GDT connection between RNC 120 and the GW 140 has been established, in Step S360, the statistics of payload transferred between the UE 110 and the GW 140 is further monitored, and whether the statistics of payload within the predetermined time period below a second threshold or not is determined. Since current communication is in 3GDT communication, so if the statistics of payload within the predetermined time period below the second threshold, then a switch from the 3GDT communication to the non-3GDT communication is trigged. On the contrary, if the statistics of payload within the predetermined time period does not below the second threshold, then the step S360 will continue to monitor the statistics of payload transferring between the UE 110 and the GW 140.

It should be noted that, since the 3GDT communication has bypassed the SGSN 130, the step S360 is suitable to be executed on the GW 140.

If it is determined to trigger switch in step S360, then in step S370 and S380, by transmitting messages between the RNC 120, SGSN 130 and the GW 140, the switch can be performed. The detail messages transmitted can be varied depending on the type of the GW 140.

For example, if the GW 140 is GGSN (in the Gn/Gp architecture), then in step S370, the GGSN 140 sends "Update PDP Context Request" message to SGSN 130, and in Step S380, the SGSN 130 sends "RAB assignment" message to the RNC 120, so that the directly 3GDT connection is broken, and the two-tunnel connection via the SGSN 130 is established in Step S390.

If the GW 140 is SGW (in the S3/S4 architecture), then in Step S370, the SGW 140 sends "Update Bearer Request" message to SGSN 130; and in Step S380, the SGSN 130 sends "RAB assignment" message to the RNC 120, so that the directly 3GDT connection is broken, and the two-tunnel connection via the SGSN 130 is established in Step S390.

It should be noted that the present application is not limited to the specific message described above.

It can be seen the Step S390 has the same status as that of Step S310, that is, the method 300 has been loop back to Step S310 and continue the monitoring of the core network system.

With the network communication system and method of the present application, the usage of 3GDT can be controlled dynamically, so that only the user payload suitable for transport via GTP tunnel is transported via the 3GDT communication, and the type of communication between UE 110 and the GW 140 can be switched dynamically based on the payload transported. With the present application, usage of 3GDT is optimized without introducing new message and IE.

It should be noted that in SGSN 130 and GW 140, the components therein are logically divided dependent on the functions to be achieved, but this invention is not limited to this, the respective components in SGSN 130 and GW 140 can be re-divided or combined dependent on the requirement, for instance, some components may be combined into a single component, or some components can be further divided into more sub-components.

Embodiments of the present invention may be implemented in hardware, or as software modules running on one or more processors, or in a combination thereof. That is, those skilled in the art will appreciate that special hardware circuits such as Application Specific Integrated Circuits (ASICs) or digital signal processor (DSP) may be used in practice to implement some or all of the functionality of all component of the SGSN 130 and GW 140 according to an embodiment of the present invention.

It should be noted that the aforesaid embodiments are illustrative of this invention instead of restricting this invention, substitute embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

The invention claimed is:

1. A method for controlling a network system, the network system comprising a user equipment (UE), a nodeB, a Radio Network Controller (RNC), a Serving GPRS Support Node (SGSN), and a gateway (GW), wherein the UE is arranged to communicate with the RNC via the nodeB, and the RNC is operable to communicate directly with one or more of the SGSN and the GW, the method comprising:
   determining, by the SGSN, a data statistic related to data received by the SGSN and transmitted by either the UE or the GW;
   determining, by the SGSN, whether the determined data statistic exceeds a first threshold, wherein the first threshold is independent of any data volume statistic determined by or for the SGSN; and
   establishing, by the SGSN, a 3G Direct Tunnel (3GDT) between the RNC and the GW for carrying user plane data transmitted by the UE and user plane data transmitted to the UE in response to determining that the determined data statistic exceeds the first threshold.

2. The method of claim 1, further comprising:
   determining, by the GW, over a predetermined time period, a second data statistic, wherein the second data statistic relates to payload transferred between the UE and the GW;
   determining, by the GW, whether the second data statistic falls below a second threshold wherein the second threshold is independent of any data volume statistic determined by or for the SGSN; and
   terminating, by the GW, the 3GDT between the RNC and the GW in response to determining that the second data statistic falls below the second threshold,
   wherein the first threshold is great than the second threshold.

3. The method of claim 1, wherein the GW can be any one of a Gateway GPRS Support Node (GGSN) and Serving Gateway (SGW).

4. The method of claim 1, wherein determining the data statistic comprises determining one or more of: a real bit rate, a ratio of real bit rate over maximum bit rate (MBR), a traffic class, ratio of GBR, transfer delay, a preference level of server IP or whole server IP, a traffic handling priority, a Allocation/Retention priority, and a Evolved Allocation/Retention priority.

5. The method of claim 3, wherein
   the GW is a GGSN,
   the step of switching from the non-3GDT communication to the 3GDT communication comprises: (a) the SGSN sending an "Update PDP Context Request" message to the GGSN; and (b) the SGSN sending a "RAB Assignment" message to the RNC, and
   the step of switching from the 3GDT communication to non-3GDT communication comprises: (a) the GGSN sending an "Update PDP Context Request" message to SGSN; and (b) the SGSN sending a "RAB assignment" message to the RNC.

6. The method of claim 3, wherein the GW is a SGW,
   the step of switching from the non-3GDT communication to the 3GDT communication comprises:
   (a) the SGSN sending a "Modify Bearer request" message to the SGW; and
   (b) the SGSN sending a "RAB Assignment" message to the RNC;
   and
   the step of switching from the 3GDT communication to non-3GDT communication comprises:
   (a) the SGW sending an "Update Bearer Request" message to SGSN; and
   (b) the SGSN sending a "RAB assignment" message to the RNC.

7. The method of claim 2, wherein the first and second data statistics are the ratio of real bit rate over maximum bit rate (MBR), the first threshold is 0.75 and the second threshold is 0.15.

8. A network system comprising a Serving GPRS Support Node (SGSN), the SGSN comprising:
   a first monitor being configured to monitor a data statistic related to data received by the SGSN and transmitted by either a User Equipment (UE) or a Gateway (GW); and
   a first controller being configured to determine whether the data statistic exceeds a first threshold or not, and if so and the UE is in a non-3G Direct Tunnel (3GDT) communication, then switch the non-3GDT communication to a 3GDT communication, wherein the first threshold is independent of any data volume statistic determined by or for the SGSN.

9. The network system of claim 8, wherein the GW is a Gateway GPRS Support Node (GGSN), and the first controller being configured to switch from the non-3GDT communication to the 3GDT communication by:
sending an "Update PDP Context Request" message to the GGSN; and
sending a "RAB Assignment" message to a Radio Network Controller (RNC).

10. The network system of claim 8, wherein the GW is a Serving Gateway (SGW), and the first controller being configured to switch from the non-3GDT communication to the 3GDT communication comprising:
sending a "Modify Bearer request" message to the SGW; and
sending a "RAB Assignment" message to the RNC.

11. The network system of claim 8, wherein the data statistic comprises one or more of: a real bit rate, a ratio of real bit rate over maximum bit rate (MBR), a traffic class, ratio of Guaranteed Bit Rate (GBR), transfer delay, a preference level of server IP or whole server IP, a traffic handling priority, a Allocation/Retention priority, and a Evolved Allocation/Retention priority.

12. The network system of claim 8, wherein the GW comprises:
a second monitor being configured to monitor a second data statistic, wherein the second data statistic relates to payload transferred between the UE and the GW; and
a second controller being configured to determine whether the second data statistic is below a second threshold or not, and if so and the UE is in the 3GDT communication, then initiate switching the 3GDT communication to the non-3GDT communication, wherein the second threshold is independent of any data volume statistic determined by or for the SGSN.

13. The network system of claim 12, wherein the GW is a Gateway GPRS Support Node (GGSN), and the second controller being configured to initiate switching from the 3GDT communication to the non-3GDT communication by:
sending an "Update PDP Context Request" message to the SGSN.

14. The network system of claim 13, wherein the GW is a Serving Gateway (SGW), and the second controller being configured to initiate switching from the 3GDT communication to the non-3GDT communication by: sending a "Update Bearer Request" message to SGSN.

15. The method of claim 1, wherein determining whether the determined data statistic exceeds the first threshold comprises comparing the determined data statistic to the first threshold.

16. The method of claim 15, wherein determining the data statistic related to data received by the SGSN and transmitted by either the UE or the GW comprises calculating the data statistic based on a bit rate.

17. The method of claim 16, wherein calculating the data statistic based on a bit rate comprises calculating the data statistic based on a monitored bit rate (BR) and a predetermined maximum bit rate (MBR).

18. The method of claim 17, wherein calculating the data statistic comprises calculating BR/MBR.

* * * * *